United States Patent
Yoshida et al.

(10) Patent No.: US 6,473,292 B1
(45) Date of Patent: Oct. 29, 2002

(54) MONOLITHIC CERAMIC ELECTRONIC COMPONENT

(75) Inventors: Kazuhiro Yoshida, Shimane-ken; Shigeki Nishiyama, Izumo; Nobushige Moriwaki, Izumo; Takeshi Azumi, Izumo; Yasuhiko Kubota, Izumo; Yoshihiro Omura, Shimane-ken; Kazuyuki Kubota, Izumo, all of (JP)

(73) Assignee: Murata Manufacturing Co., Ltd. (JP)

(*) Notice: Subject to any disclaimer, the term of this patent is extended or adjusted under 35 U.S.C. 154(b) by 0 days.

(21) Appl. No.: 09/468,264

(22) Filed: Dec. 20, 1999

(30) Foreign Application Priority Data

Dec. 28, 1998 (JP) .............................. 10-372054
Feb. 16, 1999 (JP) .............................. 11-036879
Nov. 2, 1999 (JP) .............................. 11-312411

(51) Int. Cl.[7] .............................. H01G 4/00; H01G 4/30
(52) U.S. Cl. ............... 361/321.2; 361/312; 361/309; 361/301.4
(58) Field of Search .......................... 361/301.5, 306.4, 361/303, 304, 306.1, 306.2, 306.3, 308.1, 308.2, 309, 311, 312, 313, 320, 321.1, 321.2, 321.3, 321.4, 321.5

(56) References Cited

U.S. PATENT DOCUMENTS

| | | | | |
|---|---|---|---|---|
| 5,414,588 A | * | 5/1995 | Barbee, Jr. et al. | 361/304 |
| 5,883,780 A | * | 3/1999 | Noji et al. | 361/303 |
| 5,989,726 A | * | 11/1999 | Noji et al. | 428/594 |
| 6,014,309 A | * | 1/2000 | Ueno et al. | 361/306.3 |
| 6,104,599 A | * | 8/2000 | Ahiko et al. | 361/306.3 |

FOREIGN PATENT DOCUMENTS

| | | |
|---|---|---|
| JP | 59-188113 | 10/1984 |
| JP | 03183110 | 8/1991 |
| JP | 04002106 | 1/1992 |
| JP | 4-188813 | 7/1992 |
| JP | 09148174 | 6/1997 |

* cited by examiner

Primary Examiner—Dean A. Reichard
Assistant Examiner—Eric Thomas
(74) Attorney, Agent, or Firm—Ostrolenk, Faber, Gerb & Soffen, LLP

(57) ABSTRACT

Both of the longitudinal dimension L and the widthwise dimension W of a capacitor body are at least four times the thickness-wise dimension T, respectively. Preferably, the widthwise dimension W of the capacitor body 2 is greater than the longitudinal dimension L.

8 Claims, 6 Drawing Sheets

MONOLITHIC CERAMIC ELECTRONIC COMPONENT

BACKGROUND OF THE INVENTION

1. Field of the Invention

The present invention relates to a monolithic ceramic electronic component, and more particularly to a large monolithic ceramic electronic component for use in a middle and high voltage range.

Further, the present invention relates to a monolithic ceramic electronic component, and more particularly to a monolithic ceramic electronic component which includes plural internal electrodes disposed so as to be opposed to each other through ceramic layers in a ceramic element.

2. Description of the Related Art

Conventionally, as a smoothing condenser for electric cars, electrolyte condensers and film capacitors have been used. The electrolyte condensers have high ESR, and heat is evolved when a large current flows. To prevent the evolution of heat, it is necessary to provide a high capacitance capacitor with a capacitance of fifty to sixty thousand $\mu F$. In general, the smoothing condenser comprises about 4 condensers each having an outside diameter of 8*15 cm and a capacitance of about 3000 $\mu F$. Thus, the smoothing condenser has the problem that it is very large in size. Further, the electrolyte condenser has the problem that periodic maintenance is required, since the dry up of an electrolyte occurs. On the other hand, the film capacitor has a smaller ESR than the electrolyte condenser, and the capacitance is in the rage of 400 to 1000 $\mu F$. However, since films are used as dielectric, the dielectric constant is low. Accordingly, the film capacitor comprises about two capacitors each having a size of 8*15 cm, which causes the problem that it is large in size. Further, since the film capacitor has a low resistance to heat, it is necessary further to increase the size of the film capacitor, when a large capacitance is rendered to the film capacitor.

FIGS. 3A and B are plan and front views each showing a monolithic ceramic capacitor 1 which is one example of a conventional monolithic ceramic electronic components interesting to the present invention.

As shown in FIGS. 3A and 3B, the monolithic ceramic capacitor 1 comprises a capacitor body 2 having a rectangular shape specified by a longitudinal dimension L, a widthwise dimension W, and a thickness-wise dimension T, and first and second external electrodes 3 and 4 formed on the opposite end-faces in the longitudinal direction of the capacitor body 2.

The capacitor body 2 comprises plural dielectric layers 5 which are laminated in the state that they are extended in parallel to the plane specified by the longitudinal dimension L and the widthwise dimension W, and plural sets of internal electrodes 6 which are opposed to each other through specific one of the dielectric layers 5, respectively.

As to the plural sets of internal electrodes 6, the internal electrodes electrically connected to the first external electrodes 3 and the internal electrodes electrically connected to the second external electrode 4 are alternately disposed. The internal electrode 6 shown by exploding a part of the capacitor body 2 in FIG. 3A is electrically connected to the first external electrodes which is seen in it's profile shown by the broken line. The internal electrode 6 electrically connected to the second external electrode 4 is symmetrical with the illustrated internal electrode 6.

Conventionally, in general, such a monolithic ceramic capacitor 1 is designed so that the capacitor body has a dimensional relation between the longitudinal dimension L, the widthwise dimension W, and the thickness-wise dimension T of L>W and W≦2T.

The recent market demands that such monolithic ceramic capacitors 1 as described above should have a high capacitance and be suitable for high voltage uses.

As means for meeting the above demand, it is suggested that for the monolithic ceramic capacitor 1, the lamination number of the internal electrodes 6 and the thickness of the dielectric layers 5 should be increased.

However, if such a means is employed, the dielectric layers 5 each need to have a thickness of 20 $\mu m$ or more, so that the monolithic ceramic capacitor 1 may be made suitable for use in a middle and high voltage range of a rated voltage of 250V or higher. Therefore, to attain a large capacitance of 1 $\mu F$ or more, the lamination number of the internal electrodes 6 becomes very large, and thereby, the thickness-wise dimension T of the capacitor body 2 has to be remarkably increased.

Therefore, when fired to produce the capacitor body 2, ceramics constituting the dielectric layers 5 are insufficiently sintered or are unstable. That is, pores are ready to be formed in the dielectric layers 5, the internal electrodes 6 are insufficiently sintered, and the sintering state of the internal electrodes 6 tends to have dispersions. As a result, the initial characteristics of the obtained monolithic ceramic capacitor 1 are deteriorated. That is, possibly, delamination occurs, the breakdown voltage (BDV) is reduced, and cracks are readily caused, due to the electrostriction. Also, in some cases, the reliability such as the high temperature service-life or the like may be reduced.

As means for rendering a high capacitance to the monolithic ceramic capacitor 1, it is proposed that the effective area of the internal electrodes 6 is increased by increasing the longitudinal dimension L and the widthwise dimension W of the capacitor body 2.

However, even though the effective area of the internal electrodes 6 is increased by relatively increasing the longitudinal dimension L and the widthwise direction W of the capacitor body 2 as described above, this means only taken is the same that practically no measures for improving the BDV of the monolithic ceramic capacitor 1 are taken. Accordingly, the monolithic ceramic capacitor 1 when it is applied in a middle and high voltage range encounters problems of BDV or the like.

Chip monolithic ceramic capacitors, which are typical monolithic ceramic electronic components, are produced as follows. Plural internal electrodes 52 are disposed so as to be opposed to each other through ceramics (ceramic layers) 51, and the one-ends of the internal electrodes 52 are led-out alternately to the different end-faces of the ceramic element 54. On the opposite end faces of the ceramic element 54, a pair of external electrodes 53, 53 are disposed so as to be connected to the internal electrodes 52, as shown in FIG. 9, FIGS. 10A, 10B, and 10C, for example.

In the case that the monolithic ceramic capacitor having a structure as shown in FIGS. 9 and 10, which is a product for use in a middle and high voltage range, it is not necessarily easy to secure high withstanding voltage properties. It is needed to develop monolithic ceramic capacitors with a high reliability, having a high breakdown voltage and excellent withstanding voltage properties.

The above-description, not limited to monolithic ceramic capacitors, are also true of monolithic ceramic electronic components such as varistors, inductors, and so forth.

For the purpose of enhancing the breakdown voltages of such monolithic ceramic electronic components as described above, the following methods are ordinarily suggested.

(1) a method of increasing the thickness of the element (the distance between the opposed electrodes through the ceramic layers(thickness-wise distance)), and (2) a method of rendering the internal electrodes such an electrode structure that plural series connection capacitances are formed.

However, the breakdown voltage has the tendency that it is dominated by the degree of electric fields concentrated onto the edge portions (52a in FIG. 10A) of the internal electrodes 52. In the case of the above-described methods (1) and (2) applied, it is practically difficult to enhance the breakdown voltage sufficiently, since the electric fields are concentrated onto the edge portions (peripheries and corners) of the internal electrodes 52.

Accordingly, to relax the electric field concentration onto the edge portions 52a of the internal electrodes 52, it is further necessary to devise the shape and-size of the internal electrodes 52 and the lamination-form thereof. Thus, the internal structure of the ceramic element becomes complicated, which causes the problem that the manufacturing expenditure is increased.

SUMMARY OF THE INVENTION

Accordingly, it is an object of the present invention to provide a monolithic ceramic electronic component which can solve the above-described problems, especially those of BDV.

Also, it is a further object of the present invention to provide a monolithic ceramic electronic component which can solve the above-described problems, and has excellent withstanding voltage properties even though it is a large produce, not requiring a complicated structure.

Further, it is a still further object of the present invention to provide a monolithic ceramic capacitor as a smoothing capacitor attached between an power supply and an inverter of an electric car.

The present invention is intended for a monolithic ceramic electronic component which comprises an electronic component body having a rectangular shape specified by a longitudinal dimension, a widthwise dimension, and a thickness-wise dimension, and first and second external electrodes formed on the opposite end-faces in the longitudinal direction of the electronic component body, respectively, the electronic component body comprising plural dielectric layers laminated in the state that the layers are extended in parallel to a plane specified by the longitudinal dimension and the widthwise dimension of the electronic component body, and plural sets of internal electrodes opposed to each other through a specific dielectric layer, respectively, the internal electrodes of the plural sets of internal electrodes electrically connected to the first external electrode and the internal electrodes thereof electrically connected to the second external electrode being alternately disposed. To solve the above-described technical problems, characteristically, both of the longitudinal dimension and the widthwise dimension of the electronic component body are at least four times the thickness-wise dimension thereof, respectively.

The present invention has been devised, paying attention to the relation between the longitudinal, widthwise, and thickness-wise dimensions, and BDV of an electronic component body. The BDV was evaluated by varying the longitudinal, widthwise, and thickness-wise dimensions. As a result, as described above, it has been found that the BDV is enhanced by setting both of the longitudinal and widthwise dimensions to be at least four times the thickness-wise dimension.

Further, as a result of the evaluation of the BDV by varying the longitudinal, widthwise, and thickness-wise dimensions of such an electronic component body as described above, it has been found that the BDV is further enhanced by setting the widthwise dimension to be greater than the longitudinal dimension. Thus, according to the present invention, preferably, the widthwise dimension of the electronic component body is set to be greater than the longitudinal dimension.

The present invention is applied especially advantageously in the case of such a large monolithic ceramic electronic component that both of the longitudinal and widthwise dimensions of the electronic component body are at least 10 mm, respectively, or the static capacitance is at least $1\mu F$, the thickness of each dielectric layer between the opposed internal electrodes is at least $20\,\mu m$, and moreover, the rated voltage is at least 250V.

Further, the present invention is also applied especially advantageously in the case that the internal electrodes contain a base metal.

To achieve the above-described object, the inventors examined and investigated the internal structures of monolithic ceramic electronic components. The following information was obtained.

(1) In conventional monolithic ceramic electronic components such as monolithic ceramic capacitors, ordinarily, the thicknesses t of the internal electrodes 52 (FIG. 10C) are about 1 $\mu m$.

(2) The area (plan effective area (the length l×the width w (=the width w of the internal electrodes) of the overlapping portions) of the overlapping portions 62 (FIG. 10A) of the internal electrodes is up to 5000 times the cross sectional area (the thickness t×the width w of the respective internal electrodes 52) obtained by cutting the internal electrodes 52 (FIG. 10C) perpendicular to the leading-out direction of the internal electrodes.

(3) The ratio of the plan effective area of the internal electrodes to the cross sectional area thereof exerts an influence over the withstanding voltage properties.

The inventors have carried out further experiment and investigation based on the above information, and have completed the present invention.

That is, according to a second aspect of the present invention, there is provided a monolithic ceramic electronic component which has the configuration that plural internal electrodes are disposed in a ceramic element in the form that the plural internal electrodes are opposed to each other through ceramic layers, and the one-ends of the plural internal electrodes are led-out alternately to the different side-faces of the ceramic element, the area of the overlapping portions of the internal electrodes, viewed in the plan thereof, being at least 10000 times the cross sectional area per internal electrode layer obtained by cutting the internal electrodes perpendicular to the leading-out direction of the internal electrodes.

As described above, by setting the area (plan effective area) of the overlapping portions of the internal electrodes, viewed in the plan thereof, to be at least 10000 times the cross sectional area per internal electrode layer obtained by cutting the internal electrodes perpendicular to the leading-out direction of the internal electrodes, the concentration of electric fields onto the edge portions of the internal electrodes can be relaxed to improve the withstanding voltage properties.

The present invention may be applied to monolithic ceramic electronic components of a so-called stack type, which are formed by stacking plural ceramic elements.

Preferably, the monolithic ceramic electronic component is operable in a middle and high voltage range of a rated voltage of 250V or higher.

When the present invention is applied to a monolithic ceramic electronic component for use in a middle and high voltage range of a rated voltage of 250V or higher where the withstanding voltage properties readily cause problems, advantageously, the withstanding voltage properties can be securely enhanced to such a degree that they have no problems for practical use, without the thickness of the element being increased.

Also preferably, the ceramic element has a dimension in parallel to the leading-out direction of the internal electrodes of 10 mm or more.

As to the monolithic ceramic electronic component in which the ceramic element has a dimension in parallel to the leading-out direction of the internal electrodes of 10 mm or more, especially, the withstanding voltage properties tend to cause problems. When the present invention is applied to such a large monolithic ceramic electronic component, advantageously, the withstanding voltage properties can be securely enhanced to such a degree that they have no problems for practical use.

Further, the monolithic ceramic electronic component is preferably a monolithic ceramic capacitor.

As to monolithic ceramic capacitors, especially if they are large products, the withstanding voltage properties readily cause problems. However, by applying the present invention, a monolithic ceramic capacitor having excellent withstanding voltage properties can be obtained.

DESCRIPTION OF THE PREFERRED EMBODIMENT

Figure 1A:
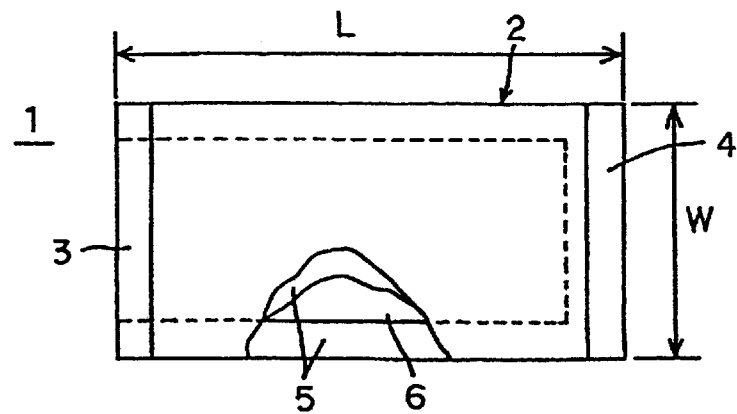
FIG. 1A is a partially exploded plan view thereof, and FIG. 1 (B) a front view each showing a monolithic ceramic capacitor according to an embodiment of the present invention.
Figure 1B:
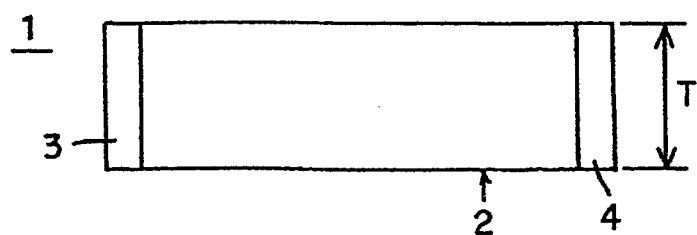

FIG. 1A is a partially exploded plan view, and FIG. 1B is a front view, each showing a monolithic ceramic capacitor 11, which is one of monolithic ceramic electronic components, according to one embodiment of the present invention.

As shown in FIG. 1, the monolithic ceramic capacitor 11 comprises a capacitor body 12 having a rectangular shape specified by a longitudinal dimension L, a widthwise dimension W, and a thickness-wise dimension T, and first and second external electrodes 13 and 14 formed on the opposite end-faces in the longitudinal direction of the capacitor body 12, respectively.

Further, the capacitor body 12 contains plural dielectric layers 15 which are laminated in the state that the layers 15 are extended in parallel to a plane specified by the longitudinal dimension L and the widthwise dimension W of the capacitor body 12, and plural sets of internal electrodes 16 which are opposed to each other through specific one of the dielectric layers 15.

As to the plural sets of internal electrodes 16, the internal electrodes electrically connected to the first external electrodes 13, and the internal electrodes thereof electrically connected to the second electrode 14 are alternately disposed. The internal electrode 16 shown by exploding a part of the capacitor body 12 in FIG. 1A is electrically connected to the first external electrode 13, which is seen in the profile depicted by the broken line. The internal electrode 16 electrically connected to the second external electrode 14 is symmetrical with the internal electrode 16 shown in FIG. 1A.

Figure 3A:
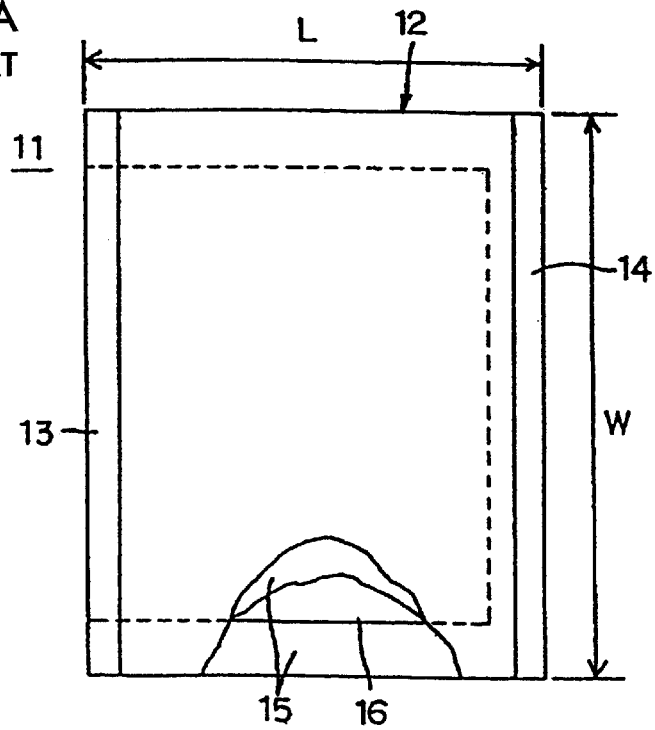
FIG. 3A is a partially exploded plan view thereof, and FIG. 3B a front view each showing a conventional monolithic ceramic capacitor 1 which is interesting to the present invention.
Figure 3B:
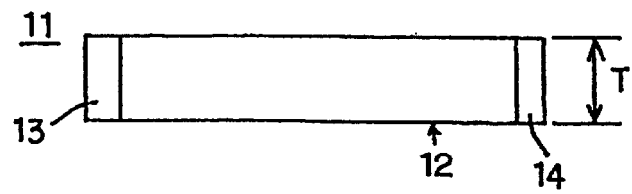

The foregoing description substantially fits a conventional monolithic ceramic capacitor 1 of FIGS. 3A and 3B.

As to the characteristic structure of the present invention, in this embodiment, the longitudinal dimension L and the widthwise dimension W of the capacitor body 12 are at least four times the thickness-wise dimension T thereof. The effective area of each internal electrode 16 can be increased by increasing both of the longitudinal dimension L and the widthwise dimension W of the capacitor body 12 as described above. Accordingly, it is not needed to achieve a high capacitance only by increasing the lamination number of the internal electrodes 16. Thus, the thickness-wise dimension T of the capacitor body 12 can be inhibited to be small. Therefore, the ceramics constituting the dielectric layers 15 can be sintered more sufficiently, and irregularities in sintering and the formation of pores can be inhibited.

In particular, it has been confirmed that for the monolithic ceramic capacitor 11 to be used in a middle and high voltage range of a rated voltage 250V or higher, the concentration of electric fields, caused when a voltage is applied between the internal electrodes 16 opposed to each other, is relaxed, since the areas of the respective internal electrodes 16 are increased, and the BDV value is significantly enhanced. Further, reducing the lamination number of the internal electrodes 16 is effective in inhibiting the generation of cracks caused by electrostriction, and moreover, contributes to the enhancement of the BDV.

Therefore, according to the present invention, both of the longitudinal dimension L and the widthwise dimension W of the capacitor body 12 are set to be at least four times the thickness-wise dimension T, respectively. In order to confirm this, experiment was carried out by using specific monolithic ceramic capacitors as samples. The results will be described below.

Monolithic ceramic capacitors having the same static capacitance and the same rated voltage were prepared, in which the ratios of L:W:T were varied as shown in the following TABLE 1. A direct current voltage was applied to the monolithic ceramic capacitors of the respective samples, and the BDV values were determined. In TABLE 1, shown are the BDV relative values of the respective samples, based on the BDV value of 1.00 of Sample 1.

TABLE 1

| Sample Number | L:W:T | BDV |
|---|---|---|
| 1 | 2:1:1 | 1.00 |
| 2 | 1:2:1 | 0.98 |
| 3 | 3:2:1 | 1.00 |
| 4 | 2:3:1 | 1.02 |
| 5 | 4:3:1 | 1.03 |
| 6 | 3:4:1 | 1.05 |
| 7 | 4:4:1 | 1.12 |
| 8 | 7:4:1 | 1.20 |
| 9 | 4:7:1 | 1.25 |
| 10 | 8:6:1 | 1.50 |
| 11 | 6:8:1 | 1.55 |
| 12 | 12:9:1 | 1.80 |
| 13 | 9:12:1 | 1.90 |

In TABLE 1, shown is the general tendency that as the ratios of L and/or W to T increase, so BDV is more enhanced. Especially, as seen in the comparison of Samples 7 with Sample 5 or 6, the BDV value is surpisingly enhanced when both of L and W are at least four times T, in contrast to the case where either or both of L and W are smaller than four times T. Accordingly, it is understood that a high BDV value can be obtained by setting both of L and W to be at least four times T as in Samples 7 through 13.

Effects on the enhancement of BDV, caused by the increase of the longitudinal dimension L and the widthwise dimension W as described above, are remarkably exhibited when the monolithic ceramic capacitors are large in size, namely, both of the longitudinal dimension L and the widthwise dimension W are at least 10 mm, respectively. Similarly, such effects appear remarkably in the case of a monolithic ceramic capacitor of which the static capacitance is 1 µF or higher, the thickness of each dielectric layer lying between the internal electrodes opposed to each other is 20 µm or more, and the rated voltage is 250V or higher.

When the internal electrodes contain a base metal such as nickel, copper, or the like, sintering is carried out in a reducible atmosphere. However, in general, it is difficult to sinter the internal electrodes sufficiently in such a reducible atmosphere. In relation to this, in this embodiment, since the lamination number of the internal electrodes 16 can be reduced, and moreover, the thickness-wise dimension T of the capacitor body 12 can be decreased, the internal electrodes can be sintered easily and sufficiently even by firing in the reducible atmosphere.

In this embodiment, characteristically, the widthwise dimension W of the capacitor body 12 is greater than the longitudinal dimension L. This dimensional relation is effective in enhancement of BDV. Referring to the above Table 1, the comparison of Sample No. 8 with Sample No. 9, Sample No. 10 with Sample No. 11, or Sample No. 12 with Sample No. 13 shows that Sample Nos. 9, 11, and 13 having a relation of L<W exhibit a BDV value higher than Sample Nos. 8, 10, and 12 having a relation of L>W. This tendency is illustrated in FIG. 2.

Figure 2:
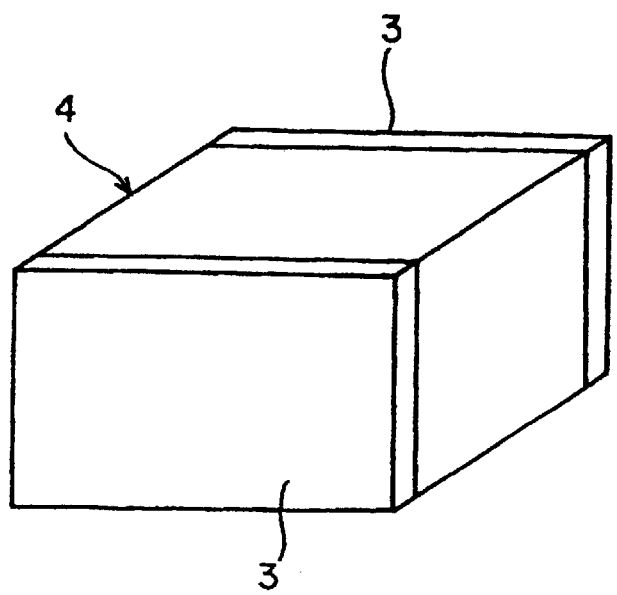
FIG. 2 is a graph showing a tendency of changes in the BDV value of the monolithic ceramic capacitor 11 as shown in FIG. 1 when the ratio of the longitudinal dimension L to the widthwise dimension W is varied.

In FIG. 2, the ratio of L:W is plotted as abscissa, and BDV as ordinate. As seen in FIG. 2, by setting W to be greater than L, BDV can be improved more significantly as compared with the case that L is greater than or equal to W.

As described above, by setting the widthwise dimension W to be greater than the longitudinal dimension L, the internal electrodes 16 can be sintered more satisfactorily, and the adhesion of the internal electrodes 16 to the dielectric layers 15 can be improved. As a result, advantageously, the generation ratio of cracks, caused by delamination and electrostriction, can be significantly reduced, as already confirmed. One of the reasons may be as follows. Organic components contained in a paste for forming the internal electrodes 16 such as resins, varnishes, or the like are moved inside of the internal electrodes 16 at firing, and lost into the outside through the portions of the internal electrodes 16 joined to the external electrodes 13 or 14 provided on the end-faces of the capacitor body 12. By setting the widthwise dimension W to be greater than the longitudinal dimension L, these organic components can be lost more readily.

Further, as described above, in the case that the internal electrodes 16 contain base metals such as nickel, copper, or the like, the firing is carried out in a reducible atmosphere. Since the organic components can be lost readily as described above even in such a reducible atmosphere, the internal electrodes 16 can be sintered more simply and sufficiently.

Figure 4:
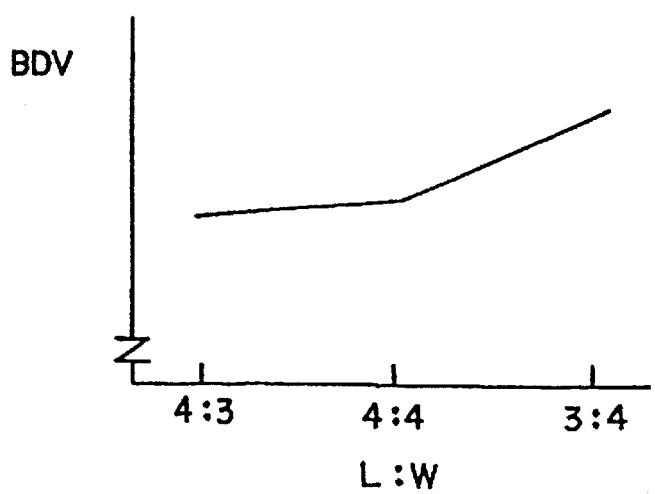
FIG. 4 is a perspective view of a monolithic ceramic electronic component according to an embodiment of the present invention.
Figure 5A:
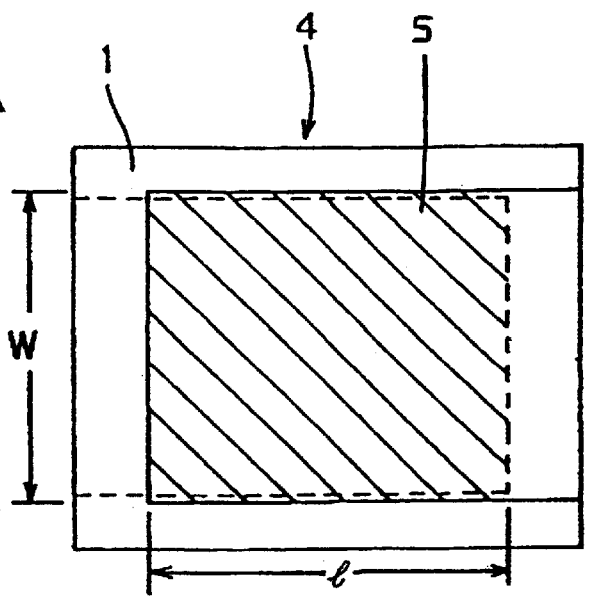
FIG. 5A is a sectional plan view, FIG. 5B a sectional front view, and FIG. 5C a sectional side view, each showing a monolithic ceramic electronic component according to an embodiment of the present invention.
Figure 5B:
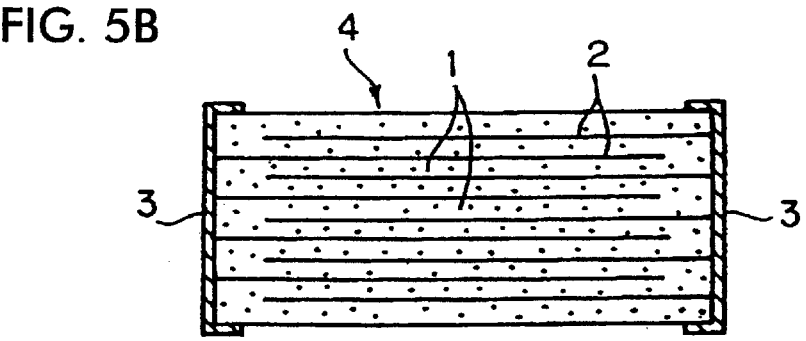
Figure 5C:
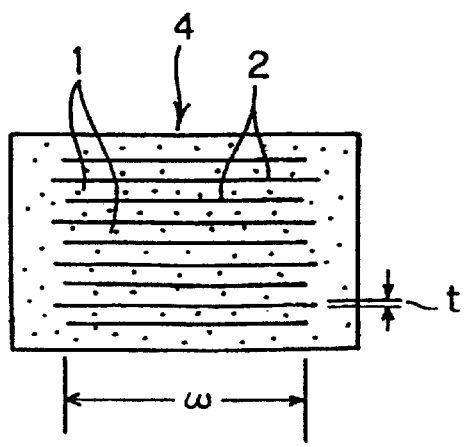

FIG. 4 illustrates a monolithic ceramic electronic component (in this embodiment, a monolithic ceramic capacitor) according to an embodiment of the present invention. FIG. 5A is a sectional plan view, FIG. 5B is a sectional front view, and FIG. 5C is a sectional side view of the monolithic ceramic electronic component.

The monolithic ceramic electronic component (monolithic ceramic capacitor) of this embodiment is formed as follows. As shown in FIGS. 4 and 5, on the opposite end-faces of the ceramic element 4, which has the structure that plural internal electrodes 2 are disposed so as to be opposed to each other through ceramics (ceramic layer) 1, and the one-ends of the internal electrodes 2 are led-out alternately to the different end-faces of the ceramic element 4, a pair of external electrodes 3,3 are disposed so as to be connected to the internal electrodes 2. The internal electrodes 2, 2 are formed by alternately laminating internal electrodes having a wide width and internal electrodes having a narrow width so that the capacitances may become constant, in consideration of probable deviations in lamination. In this case, the lamination order is arbitrary.

The monolithic ceramic electronic component is so structured that the area S1 (plan effective area) of the overlapping portions 5 of the internal electrodes 2, viewed in the plan thereof, is at least 10000 times the cross sectional area S2 (internal electrode cross sectional area) per internal electrode 2 layer obtained by cutting the internal electrodes 2 perpendicular to the leading-out direction of the internal electrodes 2. The plan effective area S1 is a value expressed by lenght L×the width of the overlapping portions as shown in FIG. 5A. The internal electrode cross sectional area S2 per layer is a value expressed by thickness t×the width W of the internal electrode 2 has shown in FIG. 5C.

In this embodiment, the length 1, the width w, and the thickness t of the above-mentioned overlapping portions of the internal electrodes 2 were measured by a method as described below.

(Measurement of Length l of Overlapping Portion of Internal Electrode)

Figure 6:
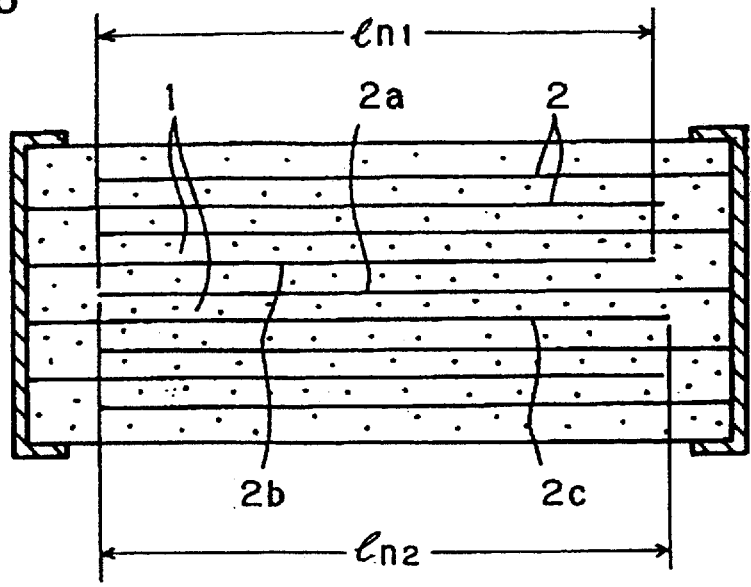
FIG. 6 illustrates a method of measuring the length of the overlapping portions of the internal electrodes of a monolithic ceramic electronic component according to an embodiment of the present invention.

The monolithic capacitor was cut in parallel to the leading-out direction of the internal electrodes, and moreover, in parallel to the lamination direction of the internal electrodes. As shown in FIG. 6, the lengths $l_{n1}$ and $l_{n2}$ of the portions of the internal electrode (2a) lying substantially at the center in the thickness direction, overlapped with the adjacent upper, lower internal electrodes (2b, 2c) through the respective ceramic layers 1 were measured with an optical microscope. The average value was taken as 1.

Also, the following method is possible. As to each of at least 10 samples (n≧10) random-sampled, the lengths $l_{n1}$ and $l_{n2}$ of the portions of the internal electrode (2a) lying substantially at the center in the thickness-wise dimension, overlapped with the adjacent upper, lower internal electrodes (2b, 2c) through the respective ceramic layers 1 are measured, as described above, and the average value $L_a$ is determined. The average values $L_a$ of the respective samples are summed up, and divided by the sample number n. The obtained value is taken as 1. In this case, desirably, the influences of dispersions in the respective samples can be reduced.

(Measurement of Width w of Overlapping Portion of Internal Electrode)

Figure 7:
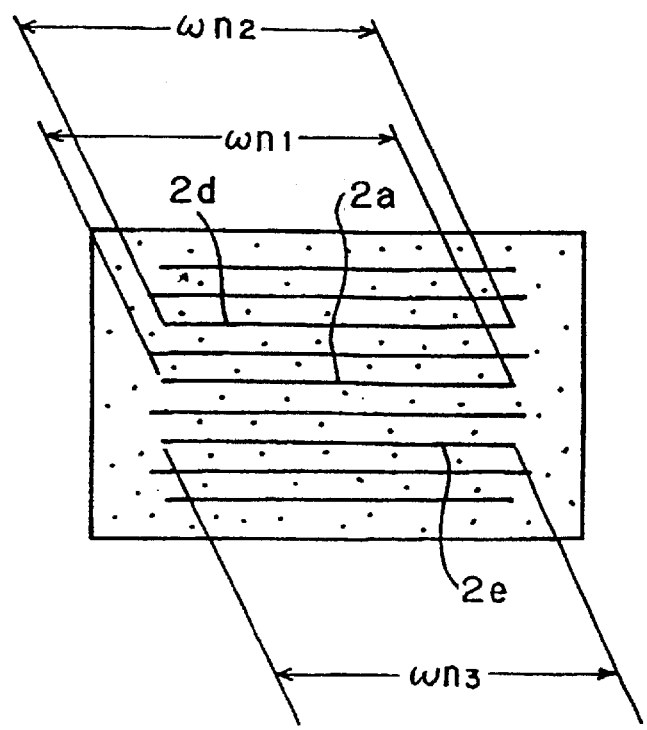
FIG. 7 illustrates a method of measuring the width of the overlapping portions of the internal electrodes of a monolithic ceramic electronic component according to an embodiment of the present invention.

The monolithic ceramic capacitor is cut in perpendicular to the leading-out direction of the internal electrodes, and moreover, in parallel to the lamination direction of the internal electrodes. As shown in FIG. 7, the widths $w_{n1}$ and $w_{n2}$ and $w_{n3}$ of a total three narrow internal electrodes (2a, 2d, 2e), that is the internal electrode (2a) lying substantially at the center in the thickness direction, and the internal electrodes (2d, 2e) positioned next to the upper, lower internal electrodes (2b, 2c), which are adjacent to the internal electrode (2a) and skipped over, are measured with an optical microscope. The average value is taken as w.

Also, the following method is possible. As to each of at least 10 samples (n≦10) random-sampled, the widths $w_{n1}$ and $w_{n2}$ and $w_{n3}$ of a total of three internal electrodes (2a, 2d, 2e) lying substantially in the center in the thickness direction, every two layers are measured with an optical microscope, as in the above-described case. The average value $W_a$ is determined. The average values $W_a$ of the respective samples are summed up, and divided by the sample number n. The obtained value is taken as w. In this case, it is desirable that influences of dispersions in the samples can be reduced.

(Measurement of Thickness t of Internal Electrode)

Figure 8:
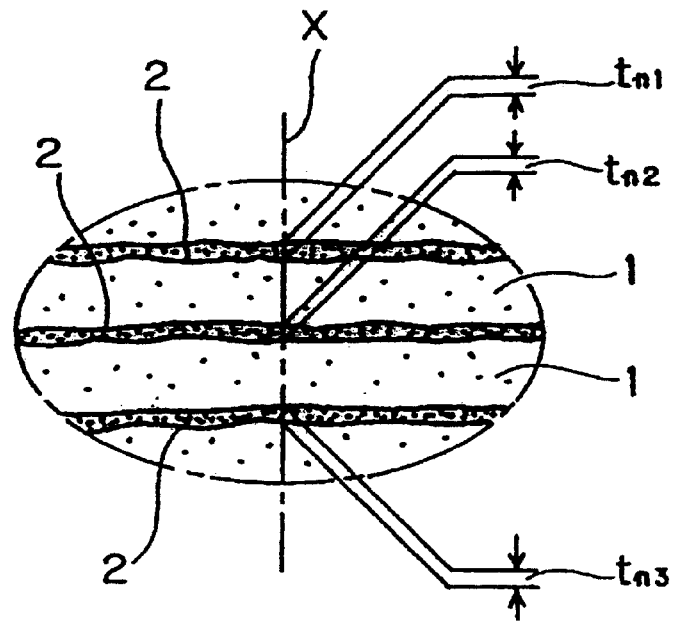
FIG. 8 illustrates a method of measuring the thickness of the internal electrodes of a monolithic ceramic electronic component according to an embodiment of the present invention.
Figure 9:
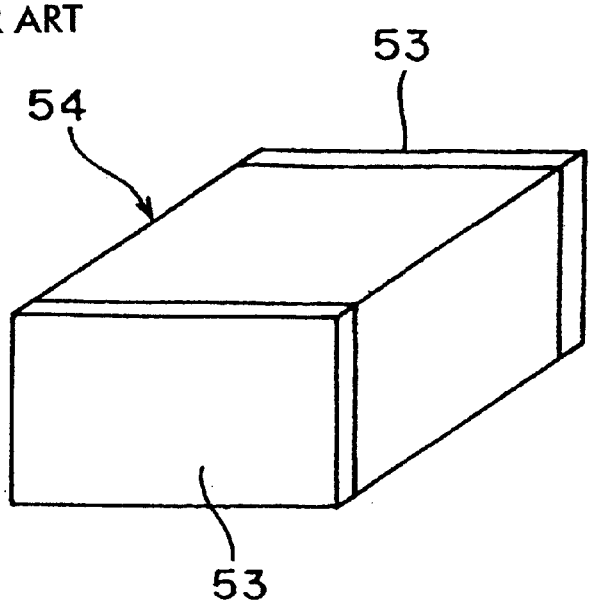
FIG. 9 is a perspective view showing a conventional monolithic ceramic electronic component.
Figure 10A:
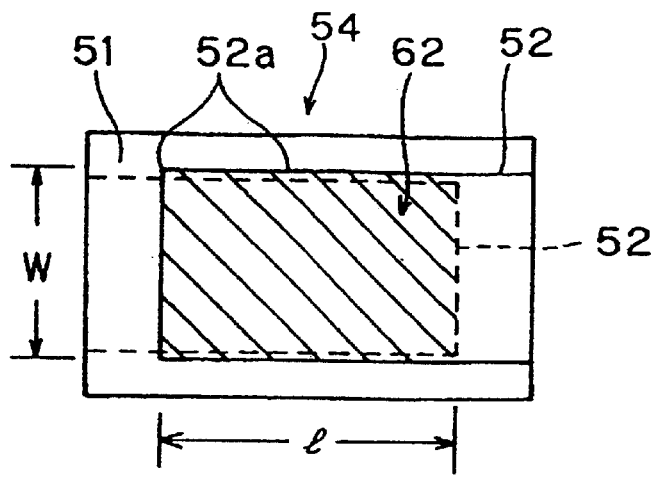
FIG. 10A is a sectional plan view, FIG. 10B a sectional front view, and FIG. 10C a sectional side view, each showing a conventional monolithic ceramic electronic component.
Figure 10B:
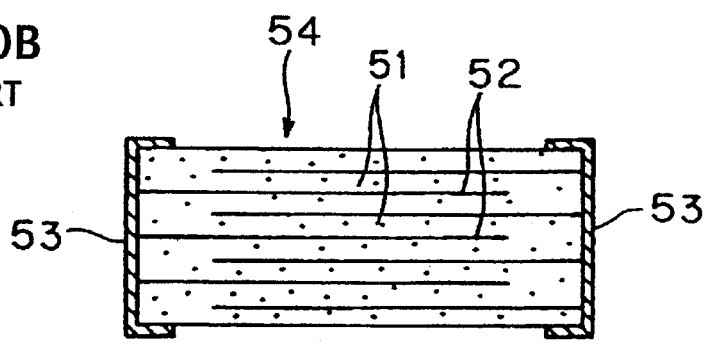
Figure 10C:
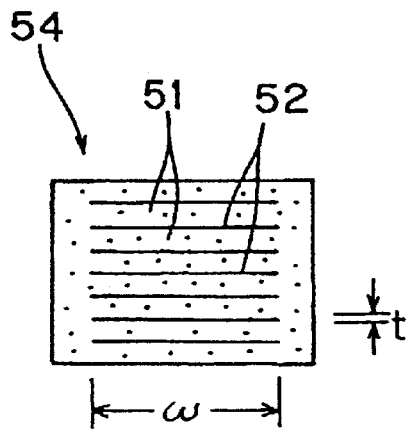

The monolithic ceramic capacitor was cut in parallel to the lamination direction of the internal electrodes 2. A vertical line X was drawn substantially from the center of the ceramic element 4 as shown in FIG. 8. The thicknesses $t_{n1}$, $t_{n2}$, $t_{n3}$... of all the internal electrodes 2 excluding the uppermost, lowermost layers on the above vertical line were measured with an optical microscope. The average value was taken as a thickness t of the internal electrodes 2.

Further, the following method is possible. As to each of at least 10 samples (n≦10) random-sampled, the thicknesses of all the internal electrodes 2 excluding the uppermost, lowermost layers are measured in the same manner as described above, and the average value $t_a$ is determined. The average values $t_a$ of the respective samples are summed up, and divided by the sample number n. The obtained value is taken as t. In this case, it is desirable that influences of dispersions in the respective samples can be reduced.

The above-described methods of measuring the length 1 and the width w of the overlapping portions of the internal electrodes and the thickness t of the internal electrodes are illustrative and not restrictive.

For example, in the case of the internal electrodes not having the above-described structure that the wide and narrow internal electrodes are alternately laminated, to measure the width w of the internal electrodes, the positions of the right and left side ends and the distance (width) between the right and left side ends of the internal electrodes positioned on the upper and lower sides of a specific internal electrode (for example, the internal electrode disposed substantially at the center in the lamination direction) as a standard are detected and measured. Moreover, the positions of the right and left side ends and the distance (width) between the right and left side ends of the specific internal electrode are detected and measured. The width w of the practically overlapping portions of the internal electrodes can be determined based on the positions on the right and left side ends and the distance (width) between the right and left side ends of-the respective internal electrodes.

In general, the breakdown voltage of a monolithic ceramic electronic component is expressed by the following formula (1).

$$breakdown\ voltage\ (BDV) = A \times B^r \qquad (1)$$

in which A represents a constant determined by a material constituting a ceramic element and the structure thereof, B the thickness of the element, and r a constant determined by a contribution ratio of the edge portions of an internal electrode to an electric filed intensity.

The r value and the breakdown voltage have the relation described below.

(1) In the case of r<0.5

The breakdown voltage suffers no changes substantially, even though the thickness of the element is changed, due to influences of ceramic defects and structural faults in addition to the concentrated electric field intensity in the edge portions of the internal electrodes.

(2) In the case of r=0.5

A general monolithic ceramic electronic component of which the breakdown voltage is dominated by the concentrated electric filed intensity in the edge portions of the internal electrodes.

(3) In the case of r>0.5

A monolithic ceramic electronic component having a high breakdown voltage can be obtained, since the concentrated electric filed intensity in the edge portions of the internal electrodes is relaxed.

In a monolithic ceramic electronic component of which the area S1 (plan effective area) of the overlapping portions 12 of the internal electrodes 2 is up to 5000 times the cross sectional area S2 (internal electrode cross sectional area) of the internal electrode 2, ordinarily, the r vale is in the range of 0.45 to 0.55, and the withstanding voltage properties tend to be insufficient, due to variations in the shape and size of the internal electrodes and the compositions of the ceramics. When the plan effective area S1 of the internal electrodes 2 is at least 10000 times the internal electrode cross sectional area S2 per layer, the r value becomes large and reaches 0.7 to 0.8 even though the component has the simple structure that the internal electrodes 2 having the same shape and size and the ceramic layers 1 are alternately laminated as shown in FIG. 2. Accordingly, the withstanding voltage properties can be significantly improved.

In the above-described embodiment, described is the example in which the internal electrodes 2 have a rectangular pattern in the plan thereof. However, the internal electrodes 2 are not limited to the rectangular pattern. The internal electrodes 2 may have other different shapes and sizes. For example, by rounding the corners of the respective internal electrodes, the concentration of the electric fields can be further inhibited, and thereby, the withstanding voltage properties can be more improved.

In the above-described embodiment, the monolithic ceramic capacitor as an example is described. The present invention is not limited to the monolithic ceramic capacitor, and may be applied to various monolithic ceramic electronic components such as varistors, inductors, and so forth.

In addition, the present invention can be applied to a monolithic ceramic electronic component of the stack type in which plural ceramic elements are stacked. In this case, the same advantages as described in the above embodiment can be obtained.

Further, in the other respects, the present invention is not limited to the above embodiments. Various applications and deformations with respect to the type of ceramics constituting the monolithic ceramic electronic component, the concrete shape and size of the ceramic element, the patterns of the internal electrodes and the external electrodes, constitutional materials, and so forth can be made without departing'the scope of the claims.

As described above, according to the present invention, both of the longitudinal dimension and the widthwise dimension of the capacitor body are at least four times the thickness-wise dimension thereof. Therefore, the effective areas of the internal electrodes can be increased, so that the concentration of the electric fields between the internal electrodes, caused when a voltage is applied, can be relaxed. Further, since the thickness-wise dimension of the capacitor body can be reduced, a sintering body having even properties can be easily obtained by firing. Accordingly, leakage current can be reduced, and the high temperature reliability of the monolithic ceramic capacitor can be enhanced.

As seen in the above description, it becomes possible to render a high BDV value to the monolithic ceramic capacitor, and moreover, the thickness-wise dimension of the capacitor body can be reduced. Thus, the miniaturization especially in volume of the monolithic ceramic capacitor can be effectively achieved.

According to the present invention, preferably, the widthwise dimension of the capacitor body is greater than the longitudinal dimension thereof, and thereby, the internal electrodes can be sintered with high stability. Accordingly, the BDV value is further enhanced, and also, dispersions in BDV are reduced. Further, since the internal electrodes can be sintered with high stability, formation of cracks, caused by delamination or electrostriction, can be effectively inhibited. Monolithic ceramic capacitors which are stable in qualities can be produced.

The above-described advantages of the present invention can be presented remarkably in the case of such a large monolithic ceramic capacitor component that both of the longitudinal and widthwise dimensions of the capacitor body are at least 10 mm, respectively, or the static capacitance is at least 1$\mu$F, the thickness of each dielectric layer between the opposed internal electrodes is at least 20 $\mu$m, and the rated voltage is 250V or higher.

Further, in the case that the internal electrodes contain a base metal according to the present invention, the firing is carried out in a reducible atmosphere. Accordingly, the sintering of the internal electrodes tend to be unstable. However, by decreasing the thickness-wise dimension of the capacitor body, reducing the lamination number of the internal electrodes, and increasing the widthwise dimension of the internal electrodes over which the internal electrodes are exposed according to the-present invention, the internal electrodes can be easily sintered with stability.

As described above, in the monolithic ceramic electronic component of the present invention, the area (plan effective area) of the overlapping portions of the internal electrodes, viewed in the plan, is at least 10000 times the internal electrode cross sectional area per layer, obtained by cutting the internal electrodes perpendicular to the leading-out direction of the internal electrodes, whereby the concentration of the electric fields onto the edge portions of the internal electrodes is relaxed, which improves the withstanding voltage properties.

When the present invention is applied to a monolithic ceramic electronic component for use in a middle and high voltage range of a rated voltage of 250V or higher where the withstanding voltage properties of the component readily cause problems, as in the case of the monolithic ceramic electronic component containing a base metal according to the present invention, advantageously, it becomes possible to enhance the withstanding voltage properties securely so that they have no problems for practical use.

In large monolithic ceramic electronic components of which the ceramic elements have dimensions in parallel to the leading-out direction of the internal electrodes of at least 10 mm, especially, the withstanding voltage properties tend to cause problems. When the present invention is applied to such large monolithic ceramic electronic components as in the case of the monolithic ceramic electronic component according to an aspect of the present invention, advantageously, the withstanding voltage properties can be enhanced to cause no problems for practical use.

In the case of monolithic ceramic capacitors, especially when they are large products, the withstanding voltage properties tend to cause problems. Preferably by applying the present invention to a monolithic ceramic capacitor, excellent withstanding voltage properties can be advantageously rendered to the monolithic ceramic capacitor.

What is claimed is:

1. A monolithic ceramic electronic component comprising
an electronic component body having a rectangular shape specified by a longitudinal dimension, widthwise dimension, and a thickness-wise dimension, and
first and second external electrodes formed on the opposite end-faces in the longitudinal direction of said electronic component body, respectively,
said electronic component body comprising plural dielectric layers laminated in the state that the layers are extended in parallel to a plane specified by the longitudinal dimension and the widthwise dimension of said electronic component body, and plural sets of first and second internal electrodes opposed to each other through specific ones of said dielectric layers, the first internal electrodes of said plural sets of internal electrodes being electrically connected to the first external electrodes, and the second internal electrodes thereof being electrically connected to the second external electrode, the first and second internal electrodes being alternately disposed with respect to each other
the longitudinal dimension and the widthwise dimension of said electronic component body being at least four times the thickness-wise dimension thereof, respectively, and the longitudinal dimension and the widthwise dimension of said electronic component body are at least 10 mm, respectively.

2. A monolithic ceramic electronic component comprising
an electronic component body having a rectangular shape specified by a longitudinal dimension, widthwise dimension, and a thickness-wise dimension, and first and second external electrodes formed on the opposite end-faces in the longitudinal direction of said electronic component body, respectively, said electronic component body comprising plural dielectric layers laminated in the state that the layers are extended in parallel to a plane specified by the longitudinal dimension and the widthwise dimension of said electronic component body, and plural sets of first and second internal electrodes opposed to each other through specific ones of said dielectric layers, the first internal electrodes of said plural sets of internal electrodes being electrically connected to the first external electrode, and the second internal electrodes thereof being electrically connected to the second external electrode, the first and second internal electrodes being alternately disposed with respect to each other, the longitudinal dimension and the widthwise dimension of said electronic component body being at least four times the thickness-wise dimension thereof, respectively, and the longitudinal dimension and the widthwise dimension of said electronic component body are at least 10 mm, respectively, wherein the static capacitance is at least $1\mu F$, each dielectric layer between said internal electrodes opposed to each other has a thickness of $20\mu m$ or more, and the rated voltage is at least 250V.

3. A monolithic ceramic electronic component comprising an electronic component body having a rectangular shape specified by a longitudinal dimension, widthwise dimension, and a thickness-wise dimension, and first and second external electrodes formed on the opposite end-faces in the longitudinal direction of said electronic component body, respectively, said electronic component body comprising plural dielectric layers laminated in the state that the layers are extended in parallel to a plane specified by the longitudinal dimension and the widthwise dimension of said electronic component body, and plural sets of first and second internal electrodes opposed to each other through specific ones of said dielectric layers, the first internal electrodes of said plural sets of internal electrodes being electrically connected to the first external electrode, and the second internal electrodes thereof being electrically connected to the second external electrode, the first and second internal electrodes being alternately disposed with respect to each other, the longitudinal dimension and the widthwise dimension of said electronic component body being at least four times the thickness-wise dimension thereof, respectively, and the longitudinal dimension and the widthwise dimension of said electronic component body are at least 10 mm, respectively, wherein said internal electrodes contain a base metal.

4. A monolithic ceramic electronic component having the structure in which plural internal electrodes are disposed in a ceramic element so as to be opposed to each other through ceramic layers, respectively, and one-ends of the plural internal electrodes are led-out alternately to the different end-faces of the ceramic element, the area of overlapping portions of the internal electrodes, viewed in the plan thereof, being at least 10000 times the cross sectional area per internal electrode layer obtained by cutting the internal electrodes perpendicular to the leading-out direction of the internal electrodes.

5. A monolithic ceramic electronic component according to claim 4, wherein the monolithic ceramic electronic component is operable in a middle and high voltage range of a rated voltage of 250V or higher.

6. A monolithic ceramic electronic component according to either of claim 4 or 5, wherein said ceramic element has a dimension in parallel to the leading-out direction of the internal electrodes of at least 10 mm.

7. A monolithic ceramic electronic component according to claims 4 or 5, wherein said monolithic ceramic electronic component is a monolithic ceramic capacitor.

8. A monolithic ceramic electronic component comprising an electronic component body having a rectangular shape specified by a longitudinal dimension, widthwise dimension, and a thickness-wise dimension, and first and second external electrodes formed on the opposite end-faces in the longitudinal direction of said electronic component body, respectively, said electronic component body comprising plural dielectric layers in the state that the layers are extended in parallel to a plane specified by the longitudinal dimension and the widthwise dimension of said electronic component body, and plural sets of first and second internal electrodes opposed to each other through specific ones of said dielectric layers, the first internal of said plural sets of internal electrodes being electrically connected to the first external electrode, and the second internal electrodes thereof electrically connected to the second external electrode, the first and second internal electrodes being alternately disposed with respect to each other, the longitudinal dimension and the widthwise dimension of said electronic component body being at least four times that thickness-wise dimension thereof, respectively, the widthwise dimension of said electronic component body being greater than the longitudinal dimension thereof and the longitudinal dimension and the widthwise dimension of said electronic component body being at least 10 mm, respectively.

* * * * *